TWO-POLE CHANNEL-DROPPING FILTER

Filed Sept. 7, 1967

INVENTOR
R. D. STANDLEY
BY Sylvan Sherman
ATTORNEY

PROTOTYPE NETWORK FOR A TWO-POLE CHANNEL DROPPING FILTER

United States Patent Office 3,441,878

Patented Apr. 29, 1969

3,441,878

TWO-POLE CHANNEL-DROPPING FILTER

Robert D. Standley, Shrewsbury, N.J., assignor to Bell Telephone Laboratories, Incorporated, Murray Hill, N.J., a corporation of New York Filed Sept. 7, 1967, Ser. No. 666,123
Int. Cl. H01p 5/12
U.S. Cl. 333—6 4 Claims

ABSTRACT OF THE DISCLOSURE

Channel-dropping filters having steeper skirt selectivity are realized in an arrangement that includes a two-stage band-rejection filter and a multiple-resonant branching filter. The latter comprises a resonant section of dual-mode circular waveguide that is supportive of both the $TE_{01}°$ and $TE_{02}°$ circular electric modes over the band of frequencies occupied by the channel to be dropped, and is resonant for the $TE_{02}°$ mode. A second resonator, comprising a section of rectangular waveguide, is wrapped around the dual-mode resonator such that one of the wide walls of the rectangular guide and a portion of the wall of the circular guide are shared in common.

Coupling between the two resonators is provided by means of a multiplicity of apertures uniformly distributed about the portion of common wall. Coupling out of the second resonator is through an aperture located in the other wide wall.

This invention relates to a circular-electric mode, channel-dropping filter having a two-pole maximally-flat response characteristic.

BACKGROUND OF THE INVENTION

The $TE_{01}°$ circular-electric mode of wave propagation in round waveguides has received considerable attention due to its recognized low-loss propagation characteristic. The problem of multiplexing in a communication system using this mode of wave propagation was first considered by E. A. J. Marcatili in his article entitled "Mode-Conversion Filters," published in the January 1961 issue of the Bell System Technical Journal, pages 149–184. The filter described by Marcatili in this article, and in his United States Patent 2,950,452, uses $TE_{01}°$ to $TE_{02}°$ circular-electric mode-conversion resonators to achieve channel separation.

In United States Patent 2,963,663, also issued to E. A. J. Marcatili, there is described a second type of channel-dropping filter for use with the $TE_{01}°$ mode of wave propagation.

Both these classes of filters have single-pole, maximally-flat frequency response characteristics which places a limit upon the number of channels which can be included within a given frequency band. As the bit rate, proposed to be used in pulse code modulation systems currently under study, is increased, implying an increased bandwidth per channel, multiple-pole filters are necessary in order to realize more efficient use of the available bandwidth. In particular, because of the steeper skirt selectivity, characteristic of the frequency response of a multi-pole filter, the channel bandwidth can be increased without increasing the channel-to-channel separation or, alternatively, the channel-to-channel separation can be decreased for a given channel bandwidth, thus increasing the total number of permissible channels.

SUMMARY OF THE INVENTION

A channel-dropping filter, in accordance with the present invention, includes a two-stage band-rejection filter and a multiple-resonant branching filter. The latter comprises a resonant section of dual-mode circular waveguide that is suportive of both the $TE_{01}°$ and $TE_{02}°$ circular electric modes over the band of frequencies occupied by the channel to be dropped, and is resonant for the $TE_{02}°$ mode. A second resonator, comprising a section of rectangular waveguide, is wrapped around the dual-mode resonator such that one of the wide walls of the rectangular guide is common to a portion of the wall of the circular guide.

Coupling between the two resonators is provided by means of a multiplicity of apertures uniformly distributed about the portion of common wall. Coupling out of the second resonator is through an aperature located in the other wide wall. In one illustrative embodiment of the invention to be described in greater detail hereinbelow, the dropped channel is coupled into a rectangular waveguide, one end of which abuts upon the second resonator to form an E-plane T-junction.

In operation, the input signal, comprising a plurality of channels propagating in the $TE_{01}°$ circular electric mode, is coupled into one end of the resonant section of dual-mode waveguide. The latter, along with the two band-rejection filters coupled to the other end of the branching filter, cause the channel that is to be dropped to be coupled through the branching filter to the output rectangular waveguide.

It is an advantage of the present invention that by virtue of the arrangement of resonant sections in the branching filter, a two-pole, maximally-flat frequency response is obtained.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
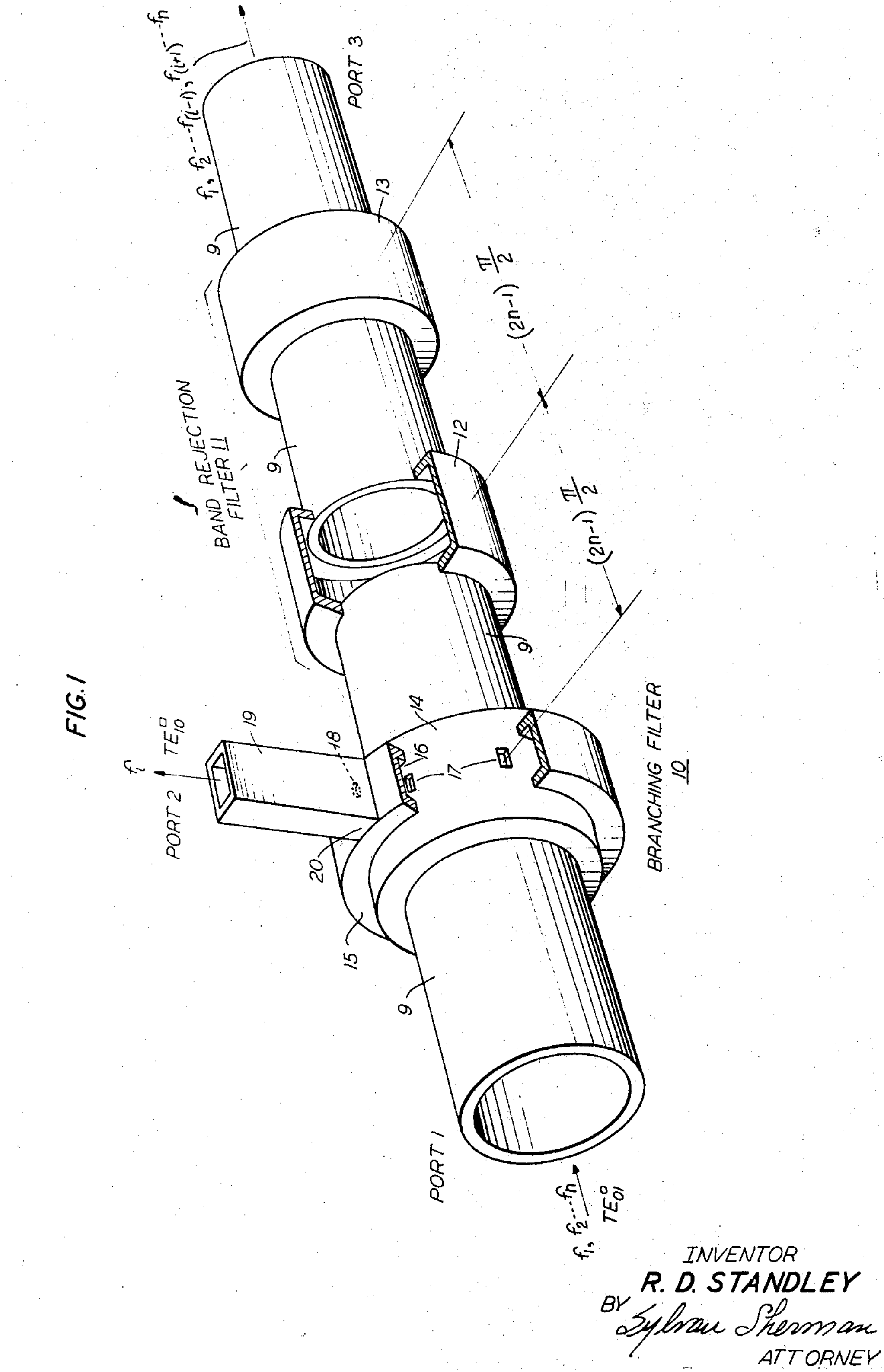
FIG. 1 shows a two-pole channel-dropping filter in accordance with the invention.

Referring to the drawings, FIG. 1 shows a two-pole, channel-dropping filter in accordance with the invention, comprising a multiple-resonant branching filter 10, and a two-stage, band-rejection filter 11 longitudinally disposed along circular waveguide 9. The latter is proportioned to support the lowest order circular electric mode, i.e., the $TE_{01}°$ mode, over a band of frequencies including $f_1$, $f_2 \ldots f_n$, and to be non-supportive of any of the higher order circular electric modes over this frequency band.

For purposes of illustration, the band-rejection filter is of the type described in United States Patent No. 2,950,452, issued to E. A. J. Marcatili on Aug. 23, 1960, and comprises a pair of dual-mode resonators 12 and 13. The design and mode of operation of this filter is described in detail in the above-mentioned Marcatili patent. Briefly, each resonator is proportioned to support wave energy over a band of frequencies centered at $f_1$ in both the $TE_{01}°$ and $TE_{02}°$ circular electric modes and, in addition, to be resonant at frequency $f_1$ for the $TE_{02}°$ mode. The electrical center-to-center spacing between resonators 12 and 13 is equal to an odd multiple of $\pi/2$ radians with respect to the center frequency of the channel to be rejected. The equivalent physical center-to-center spacing can be calculated using equations 107 and 108, found on page 120 of the above-identified article by Marcatili.

Branching filter 10 similarly comprises a dual-mode resonator 14, proportioned to resonate the $TE_{02}°$ mode at center frequency $f_1$. In addition, there is a resonant section of conductively-bounded rectangular waveguide 15 wrapped around the circumference of resonator 14 such that the wide walls of the wrap-around guide are parallel to the longitudinal axis of waveguide 9. In the illustrative embodiment of FIG. 1, a portion 16 of the circumferential surface of resonator 14 is shared in common with, and forms one of the wide walls of resonant guide 15.

Coupling between resonator 14 and waveguide 15 is through a plurality of apertures 17 extending through the common wall portion 16. The apertures are uniformly spaced about the circumference of resonator 14 with a center-to-center spacing between adjacent apertures equal to one guide wavelength of the wave energy in guide 15. As is known, the guide wavelength of the wave energy in guide 15 is a function of the width of guide 15.

A typical number of coupling apertures between resonators 14 and 15 is about six. As the number of apertures is increased, the bandwidth of the branching filter tends to decrease. This consideration sets an upper limit to the number of apertures. As the number of apertures is decreased, on the other hand, the tendency for mode conversion to occur in the circular waveguide between the $TE_{01}°$ mode and other non-circular modes, is increased. This consideration sets a lower limit to the number of apertures that are used.

Coupling out of the branching filter, to output waveguide 19, is through an aperture 18 in the outer wide wall 20 of guide 15. The location of this aperture depends upon the nature of the output coupling. In the embodiment of FIG. 1, output waveguide 19 is a conductively-bounded rectangular waveguide oriented with its wide walls parallel to the longitudinal axis of guide 9, and with one end abutting upon the outer wall 20 of guide 15 to form an E-plane T-junction. In this arrangement, aperture 18 is symmetrically located between any pair of adjacent apertures 17.

The electrical center-to-center spacing between branching filter 10 and the adjacent band-rejection filter 12 is equal to an odd multiple of $\pi/2$ radians at the center frequency $f_1$ of the channel to be dropped.

In operation, wave energy, including a plurality of channels centered at frequencies $f_1, f_2 \ldots f_n$ propagating along waveguide 9 in the $TE_{01}°$ mode, is coupled into port 1 of the channel-dropping filter comprising branching filter 10 and band-rejection filter 11. Wave energy centered at frequency $f_1$, for which the filter is designed, is separated from the rest of the channels and leaves by way of port 2 in output waveguide 19. The remaining channels $f_1, f_2 \ldots f_{(1-1)}, f_{(1+1)} \ldots f_n$, continue propagating along waveguide 9 in the $TE_{01}°$ mode to a next channel separating filter by way of port 3.

Figure 2:
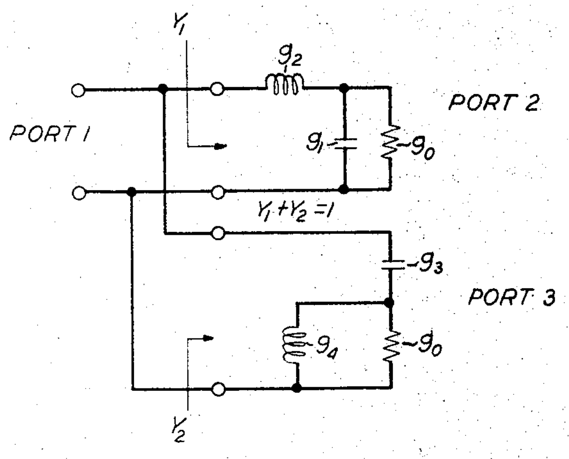
FIG. 2, included for purposes of explanation, shows a prototype network for the filter of FIG. 1.

Some insight into the electrical behavior of the channel-separating filter of FIG. 1 can be obtained by considering the prototype network shown in FIG. 2. The prototype network consists of complementary admittances connected in shunt. The elements of the network have been chosen to yield a two-pole, maximally-flat insertion loss response between ports 1 and 2 while maintaining a constant input admittance as a function of frequency. (See G. L. Matthaei et al., Design of Microwave Filters, Impedance Matching Networks, and Coupling Structures, McGraw-Hill Book Company, Inc., New York, 1964, and G. L. Matthaei et al., "Novel Microwave Filter Design Techniques," Contact DA 36–039–AMC–00084(E), Final Report, Chapter 10, Stanford Research Institute, Menlo Park, Calif., December 1964.)

Total power transfer occurs at zero frequency, and half-power transfer occurs at an input angular frequency of one radian. The prototype network is converted to a network having total power transfer at some frequency $\omega_0$ through use of the angular frequency mapping function $$\omega' = Q_L\left(\frac{\omega}{\omega_0} - \frac{\omega_0}{\omega}\right)$$

where $\omega'$=angular frequency variable of the prototype network
$\omega$=angular frequency variable of the desired network
$Q_L = \omega_0/\omega_1 - \omega_2$
$\omega_1$, $\omega_2$=half-power angular frequencies of the desired network.

The relationship between the prototype network parameters and the parameters of the structure shown in FIG. 1 are discussed in detail hereinbelow. For the purpose of obtaining a qualitative understanding of electrical behavior it is sufficient to state that the performance of the microwave structure is identical to that of the frequency mapped prototype network subject only to the approximations involved in relating their respective parameters.

DESIGN PROCEDURE

The necessary equations for designing a channel-dropping filter in accordance with the invention are given below under the heading Derivation of the Design Equations. While much detail is included therein, it is sufficient merely to use the results thus obtained and design the various elements in accordance with the following procedure.

(1) Equations 2, 15 and 16 are used to compute the external Q's of the mode conversion resonators 12, 13 and 14.

(2) The wrap-around resonator, formed by waveguide 15, is designed using Equations 1 and 7. The additional feature that the coupling apertures 17 are to be separated by one guide wavelength in the wrapped structure at resonance must also be observed. As noted above, this is controlled primarily by the width, $a_w$, of waveguide 15, and also by the diameter of resonator 14. The thickness of wall 16 in which apertures 17 are located is also significant.

(3) The coupling aperture dimensions are determined by Equations 2 and 14.

(4) The magnitude of the normalized coupling reactance required at the output aperture 18 ($X_1/R_1$) is determined from Equation 6.

*Derivation of the design equations*

A. BRANCHING FILTER

The branching filter consists of a $TE_{01}°$—$TE_{02}°$ mode conversion resonator 14 coupled to a wrapped rectangular waveguide resonator 15. The physical parameters of the latter are to be related to that portion of the network of FIG. 2 consisting of the elements $g_0$, $g_1$, and $g_2$. The parameters of interest are the external Q's, $Q_e$, of the two resonators and the coefficient of coupling between them, $k_{12}$. Using the notation of Chapter 8 of the above-cited book by Matthaei, there is obtained $$Q_{ew} = g_0 g_1 \omega_1' Q_L = \omega_1' Q_L/\sqrt{2} \quad (1)$$

$$Q_{em} = g_2 g_0 \omega_1' Q_L = \sqrt{2}\omega_1' Q_L \quad (2)$$

$$k_{12} = 1/\omega_1' Q_L \sqrt{g_1 g_2} = 1/\omega_1' Q_L \quad (3)$$

where $\omega_1'$ is the bandpass edge angular frequency of the prototype network, and $Q_L$ is the desired loaded Q of the diplexer.

The subscripts *w* and *m* refer to the wrapped resonator and the mode conversion resonator, respectively.

The next step is to derive the expressions for the external Q's and coupling coefficient in terms of the physical parameters of the structure.

The results of Marcatili's analysis given in his above-cited article show that $$Q_{em}=Q_L \tag{4}$$

where
$Q_L$ is given by Marcatili's equation (70).

The external Q of the wrapped resonator, $Q_{ew}$ is obtained from the defining equation.

$$Q_{ew}=\frac{\frac{\omega_0}{2}\left.\frac{\partial X^1}{\partial \omega}\right|_{\omega_0}}{R_c} \tag{5}$$

where
$\omega_0=2\pi x$ resonant frequency:
$X_1$=resonator reactance function;
and
$R_c$=coupled resistance.

The resulting expressions when substituted in Equation 5 yield $$Q_{ew}=\frac{Z_{10}\theta_0\left(\frac{\lambda g_0}{\lambda}\right)^2}{4\frac{X_i^2}{R_i}} \tag{6}$$

where
$Z_{10}$=characteristic impedance of the wrapped guide;
$\lambda g_0$=guide wavelength of the wrapped guide at resonance;
$X_i$=reactance of aperture 18;
$R_1$=characteristic impedance of the input guide;
and
$\theta_0$=length of the wrapped structure in radians at resonance.

In general $\theta_0=\pi p$ where $p$ is the number of coupling apertures. For loose coupling $$Q_{ew}=\frac{2\pi p\left(\frac{\lambda g_0}{\lambda}\right)^2}{c^2} \tag{7}$$

where $$c^2=8\frac{X_1^2}{R_1 Z_0} \tag{8}$$

is the power coupling coefficient between guides.

The coupling coefficient $k_{12}$ is given in terms of the resonator parameters by $$k_{12}=X_{12}/\sqrt{x_1 x_2} \tag{9}$$

where
$X_{12}$=coupling reactance;

$x_1=\frac{\omega_0}{2}\left.\frac{dX_1}{d\omega}\right|_{\omega_0}$=slope parameter of the first resonator;

and $x_2=\frac{\omega_0}{2}\left.\frac{dX_2}{d\omega}\right|_{\omega_0}$=slope parameter of the second resonator.

To evaluate $k_{12}$, requires calculation of $X_{12}$ as it is related to the physical structure. The slope parameters are known from the external Q calculations. For loose coupling, $X_{12}$ is related to the power coupling coefficient between the $TE_{02}°$ waveguide and the $TE_{10}$ wrapped waveguide by $$|\Gamma_{12}|^2\cong\frac{X_{12}^2}{2Z_{02}Z_{10}} \tag{10}$$

where
$Z_{02}$ is the characteristic impedance of the $TE_{02}°$ waveguide.

If loose coupling is assumed, Bethe's small hole coupling theory can be applied to yield $$|\Gamma_{12}|^2=\frac{18p^2k^2G^2}{abR^4}\frac{\lambda_{g02}}{\lambda_{g10}}M^2 \tag{11}$$

where
$a$=wrapped guide width;
$b$=wrapped guide height;
$p$=number of apertures;
$k$=7.016;
$G$=.07075;
R=radius of $TE_{02}°$ guide;
$\lambda_{g02}=TE_{02}°$ guide wavelength;
$\lambda_{g10}$=wrapped guide wavelength;
and
M=magnetic polarizability of the aperture.

The above assumes the apertures to be $\lambda_{g10}$ apart in the wrapped structure. The magnetic polarizability of the aperture is determined from, $$M=\frac{M_0}{1-\left(\frac{\lambda_{ca}}{\lambda}\right)^2}10^{-\left[\frac{2.73tA}{\lambda_{ca}}\sqrt{1-\left(\frac{\lambda_{ca}}{\lambda}\right)^2}\right]} \tag{12}$$

where
$M_0$=static polarizability of the aperture;
$\lambda_{ca}$=cutoff wavelength of the dominant aperture mode;
$t$=aperture thickness;
and
$A$=empirical constant.

Matthaei's book contains an excellent collection of data on $M_0$ for various types of apertures.

The above analysis when rearranged yields $$k_{12}=\sqrt{\frac{2Z_{02}Z_{10}}{x_1x_2}}|\Gamma_{12}|\frac{1}{\omega_1'Q_L\sqrt{g_1g_2}} \tag{13}$$

from which $$M^2=\frac{x_1x_2}{2Z_{02}Z_{10}}\frac{1}{g_1g_2}\frac{abR^4}{18p^2k^2G}\frac{\lambda_{g10}}{\lambda_{g02}}\frac{1}{\omega_1'^2Q_L^2}$$

or $$M=\frac{R^2}{6pkG^{1/2}\omega_1'Q_L}\sqrt{\left(\frac{ab}{g_1g_2}\right)\left(\frac{\lambda_{g10}}{\lambda_{g02}}\right)\left(\frac{x_1}{Z_{10}}\right)\left(\frac{x_2}{Z_{02}}\right)} \tag{14}$$

The latter then represents the relationship between the required aperture dimensions and the characteristics of the filter.

B. REJECTION FILTERS

From Matthaei it is found that the loaded Q's of the rejection filters are given by $$Q_{L1}=\sqrt{2}Q_L \tag{15}$$

$$Q_{L2}=2\sqrt{2}Q_L \tag{16}$$

where $Q_{L1}$ applies to the rejection filter nearest the branching filter. The loaded Q's of the rejection filters in terms of the physical parameters are given in Marcatili's article by Equation 139.

Figure 3:
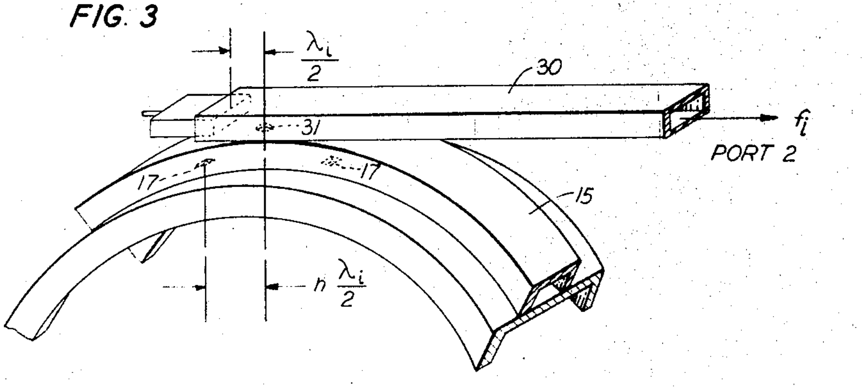
FIGS. 3 and 4 illustrate alternate arrangements for coupling wave energy out of the channel-dropping filter of FIG. 1.
Figure 4:
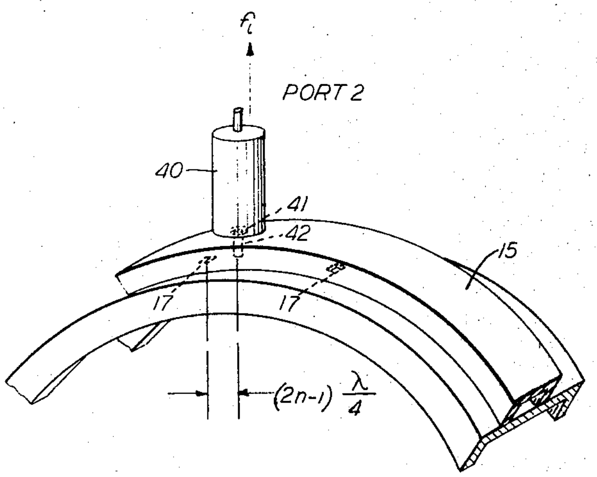

In the illustrative embodiment of a two-pole channel-dropping filter described in connection with FIG. 1, resonant, dual-mode, band-rejection filters are shown. It will be recognized, however, that other filter arrangements can just as readily be used. As an example of one such other filter, employing resonant irises, see United States Patent 2,991,431, issued to S. E. Miller, July 4, 1961. In addition, alternate arrangements for coupling out of wrap-around waveguide 15 can be used, as illustrated in FIGS. 3 and 4. For example, in FIG. 3, a rectangular output waveguide 30 is oriented at a tangent to wrap-around waveguide 15, with the narrow walls of the two guides parallel to each other. Coupling is through an aperture 31 which extends through one of the wide walls of each of the respective guides at their region of contact. A conductive, shorting plunger terminates one end of guide 30 approximately one-half wavelength away from aperture 31. The dropped channel is extracted from the other end of guide 30. As in the embodiment of FIG. 1, output aperture 31 is symmetrically located between any pair of apertures 17.

In the arrangement illustrated in FIG. 4, a coaxial cable 40 abuts upon the outer wide wall of waveguide 15. A probe 42, constituting an extension of the center conductor of coax 40, extends into waveguide 15 through an aperture 41. In this coupling arrangement, aperture 41 is asymmetrically located with respect to any pair of adjacent apertures 17. More particularly, aperture 41 is spaced away from the next adjacent aperture 17 a distance equivalent to an odd multiple of a quarter of a wavelength at frequency $f_i$.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. In an electromagnetic wave transmission system supportive of wave energy in the $TE_{01}^{\circ}$ circular electric mode of propagation over a frequency range $f_1$ through $f_n$ and nonsupportive of said wave energy in the higher circular modes, a channel-dropping filter for extracting a band of wave energy centered at a frequency $f_i$ within said range of frequencies;

said filter including a branching filter and a two-stage band-rejection filter spaced apart along said system at intervals equal to an odd multiple of $\pi/2$ radians at frequency $f_i$;

characterized in that said branching filter comprises;

a multimode section of circular waveguide proportioned to support both the $TE_{01}^{\circ}$ and $TE_{02}^{\circ}$ circular electric modes of propagation at said frequency $f_i$ and to resonate said $TE_{02}^{\circ}$ circular electric mode;

an annular section of rectangular waveguide wrapped about the outer circumference of said multimode section of circular waveguide and adapted to resonate at frequency $f_i$;

means for coupling between said rectangular waveguide and said circular waveguide comprising a multiplicity of apertures uniformly distributed about the circumference of said circular waveguide at intervals equal to one guide wavelength of said rectangular waveguide and extending from within said circular waveguide to within said rectangular waveguide through one of the wide walls thereof;

and means for extracting wave energy at frequency $f_i$ from said rectangular waveguide.

2. The filter according to claim 1 wherein said means for extracting wave energy from said rectangular waveguide comprises an aperture located in the other wide wall of said rectangular waveguide symmetrically situated between any adjacent pair of said multiplicity of apertures.

3. The filter according to claim 1 wherein said band-rejection filter comprises two dual-mode resonant sections of circular waveguide proportioned to support both the $TE_{01}^{\circ}$ and $TE_{02}^{\circ}$ circular electric modes of propagation at frequency $f_i$, and to resonate said $TE_{02}^{\circ}$ circular electric mode.

4. The filter according to claim 1 wherein said means for extracting wave energy from said rectangular waveguide comprises an aperture located in the other wide wall of said rectangular waveguide spaced an odd multiple of a quarter of a guide wavelength from any adjacent pair of said multiplicity of apertures.

References Cited

UNITED STATES PATENTS 2,950,452 8/1960 Marcatili.
2,963,663 12/1960 Marcatili ............ 333—9

ELI LIEBERMAN, *Primary Examiner.*

P. L. GENSLER, *Assistant Examiner.*

U.S. Cl. X.R.

333—73